US006584420B1

(12) United States Patent
Minami

(10) Patent No.: US 6,584,420 B1
(45) Date of Patent: Jun. 24, 2003

(54) DEFECT EXAMINATION APPARATUS

(75) Inventor: Takeshi Minami, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 22 days.

(21) Appl. No.: 09/722,994

(22) Filed: Nov. 27, 2000

(30) Foreign Application Priority Data

Nov. 29, 1999 (JP) ............................................. 11-338418
Nov. 21, 2000 (JP) ....................................... 2000-354573

(51) Int. Cl.⁷ ................................................. G06K 9/00
(52) U.S. Cl. .......................... 702/82; 382/147; 382/149
(58) Field of Search ...................... 702/81, 82; 382/147, 382/149, 150, 151, 152, 154

(56) References Cited

U.S. PATENT DOCUMENTS 6,075,881 A * 6/2000 Foster et al. ................. 382/141
6,151,406 A * 11/2000 Chang et al. ................ 382/147

FOREIGN PATENT DOCUMENTS

| JP | 10-62121 | 3/1998 | |
| JP | 10-062121 | * | 3/1998 |
| JP | 10-288505 | | 10/1998 |
| JP | 2000-227319 | | 8/2000 |

* cited by examiner

Primary Examiner—John Barlow
Assistant Examiner—John Le
(74) Attorney, Agent, or Firm—Frishauf, Holtz, Goodman & Chick, P.C.

(57) ABSTRACT

A defect examination apparatus detects defect locations for a plurality of to-be-inspected objects vertically and horizontally arranged according to a prescribed rule. A blob analysis section finds location coordinates for the plurality of to-be-inspected objects. Based on location coordinates found by this blob analysis section, a rotation angle calculation section finds a rotation angle for a horizontal series of the to-be-inspected objects against a horizontal line. The rotation angle calculation section also finds a rotation angle for a vertical series of the to-be-inspected objects against a vertical line. A pitch size calculation section finds vertical and horizontal pitch sizes for the plurality of to-be-inspected objects. A matrix number analysis section finds a matrix number for each to-be-inspected object based on a rotation angle found by the rotation angle calculation section and a pitch size found by the pitch size calculation section.

10 Claims, 11 Drawing Sheets

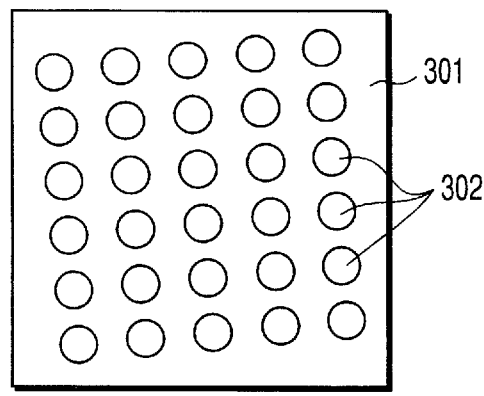
FIG. 3
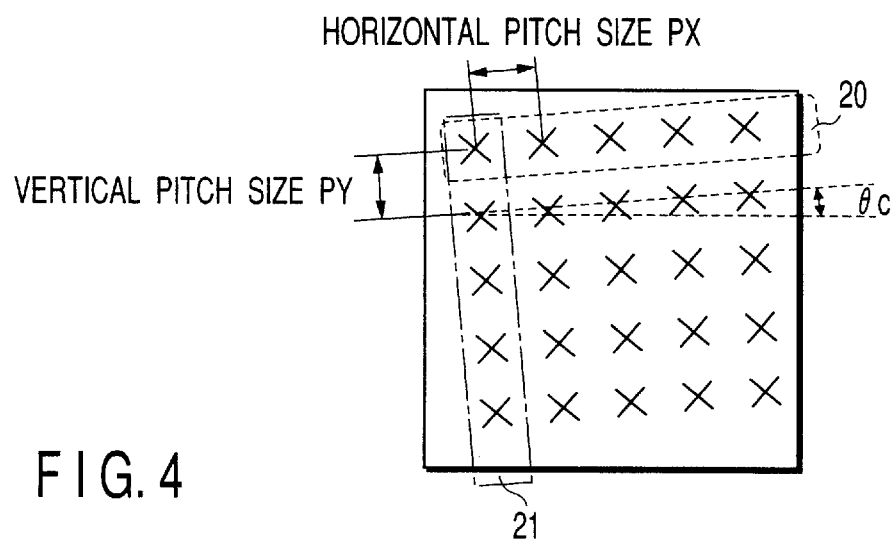
FIG. 4
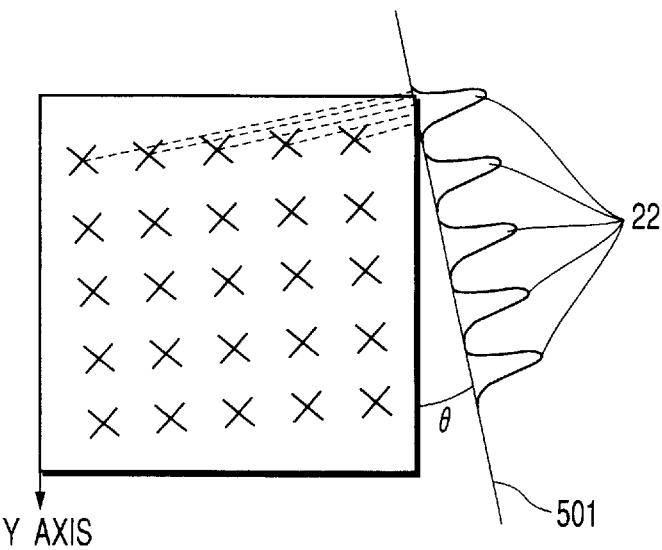
FIG. 5 Y AXIS

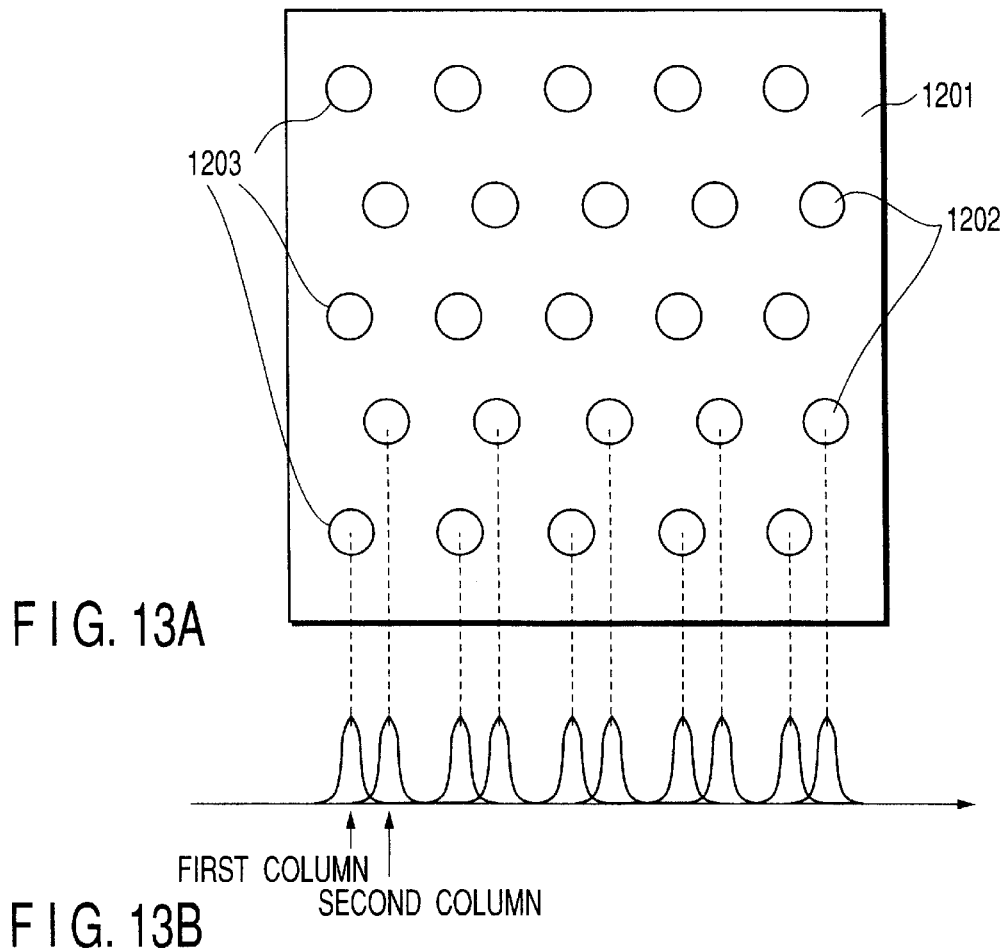
FIG. 13A
FIRST COLUMN
SECOND COLUMN
FIG. 13B
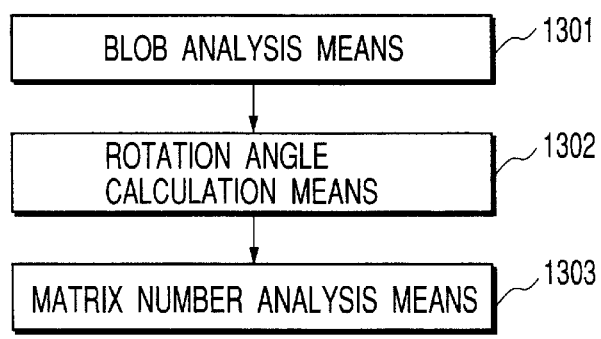
FIG. 14

CELL WITH MATRIX NUMBER 2-2
CELL WITH MATRIX NUMBER 2-3

DEFECT EXAMINATION APPARATUS

CROSS-REFERENCE TO RELATED APPLICATIONS

This application is based upon and claims the benefit of priority from the prior Japanese Patent Applications No. 11-338418, filed on Nov. 29, 1999, and No. 2000-354573, Nov. 21, 2000; the entire contents of which are incorporated herein by reference.

BACKGROUND OF THE INVENTION

The present invention relates to a defect examination apparatus. More particularly, the present invention relates to a defect examination apparatus for detecting defect locations of a plurality of to-be-inspected objects which are vertically and horizontally placed according to a prescribed rule.

Widely known is a defect examination apparatus for detecting a defect of a solder bump (hereafter simply referred to as a bump) as a to-be-inspected object which is formed on, say, a printed circuit board.

Though not prior art (accordingly not disclosed), the applicant proposed, in Jpn. Pat. Appln. No. 10-339335, an example of such a defect examination apparatus for comprehensively judging defects according to an inspection result from a plurality of image measuring means. This defect examination apparatus stores correspondence between information about bumps inspected by a plurality of image measuring means and ID information indicating each bump location.

The defect examination apparatus finds a matrix number as ID information for indicating each bump location as follows. To find a row number, for example, any bump is used as a reference for searching a horizontally adjacent bump. The found bump is used as a new reference for further searching an adjacent bump. This search is repeated in both directions until no bump is found. When final bumps are found at both ends, these bumps are connected with a line which is used as a reference line. A row number can be found according to a distance from this reference line to each bump and a predefined pitch size.

Jpn. Pat. Appln. KOKAI Publication No. 10-062121 discloses the following method. Namely, an obtained BGA (ball grid array) image is used for finding a slant of a BGA ball array's external edge. An intersection point is found for external edges of vertical and horizontal BGA ball arrays. The found slant and the intersection point are used for accurately measuring BGA ball locations.

Further, Jpn. Pat. Appln. KOKAI Publication No. 10-288505 discloses the method for locating a work. According to this method, a plurality of members having a specified size is arranged by a specified rule on a face of a work under examination. Before a full-scale inspection, an approximate location of this work can be specified accurately and fast.

However, the defect examination apparatus described in Jpn. Pat. Appln. No. 10-339335 causes the following problems. As shown in FIG. 16, there may be dust 2002 at an end along a search direction. If the dust 2002 is found as a bump 2000, a reference line 2001 to be found is slanted against an array of bumps 2000, preventing a row number from being found correctly. Searching adjacent bumps causes inconvenience of having to specify a pitch size as a design value or a search range sufficiently including a pitch size as a design value. It is very time-consuming to search as many as several thousand bumps and check these bumps one by one if each bump is adjacent to a reference bump. The use of more than one pitch size provides an incorrect row or column number.

In Jpn. Pat. Appln. KOKAI Publication Nos. 10-062121 and 10-288505, complicated operations are needed beforehand for detecting an array and a slant of bumps. Namely, part of a region under examination must be limited for calculating an array and a slant of bumps.

For example, the explanation with reference to FIGS. 3, 4, and 13 in Jpn. Pat. Appln. KOKAI Publication No. 10-062121 contains description about specification of regions b1, b2, and the like including a column of bumps. It is considered that operations for this portion need to be updated each time a sample is changed. Though it is possible to automate these processes, they are still complicated and time-consuming. Also in Jpn. Pat. Appln. KOKAI Publication No. 10-288505, it is necessary to appropriately specify a region including a column or row of bumps beforehand.

In Jpn. Pat. Appln. KOKAI Publication Nos. 10-062121 and 10-288505, there are provided two inspection frames for finding an approximate slant. The method is used to find locations which greatly vary the total brightness in these inspection frames. However, this method may yield an incorrect slant if there is dust.

In Jpn. Pat. Appln. KOKAI Publication Nos. 10-062121 and 10-288505, the method is used to rotate an inspection frame and assume an angle to be a slant when the total brightness in the inspection frame becomes maximum. However, this method may yield an incorrect slant depending on where to specify a rotation center in the inspection frame.

Jpn. Pat. Appln. KOKAI Publication Nos. 10-062121 and 10-288505 disclose only the method for finding a slant in the row direction. A slant in the column direction is assumed to be orthogonal to the slant in the row direction. No specific method is disclosed. There is provided no method for finding a matrix number.

Jpn. Pat. Appln. KOKAI Publication No. 10-62121 is inapplicable to irregularly arranged bumps which do not follow a prescribed rule. Jpn. Pat. Appln. KOKAI Publication No. 10-288505 discloses a method for processing an array having an irregular pitch. However, there is a problem of previously providing information about the number of bumps and a distance between bumps in a bump column.

BRIEF SUMMARY OF THE INVENTION

It is therefore an object of the present invention to provide a defect examination apparatus which can number a plurality of to-be-inspected objects accurately and fast.

It is another object of the present invention to provide a defect examination apparatus which can implement numbering without necessitating previous information even if there exist irregularly arranged bumps not following a prescribed rule.

It is yet another object of the present invention to provide a defect examination apparatus which can achieve correct correspondence among different sensors or works even if same numbers are not assigned.

For achieving the above-mentioned objects, the first aspect of the present invention is a defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means;

pitch size calculation means for finding vertical and horizontal pitch sizes of the plurality of to-be-inspected. objects; and matrix number analysis means for finding a matrix number for each to-be-inspected object based on a rotation angle found by the rotation angle calculation means and a pitch size found by the pitch size calculation means.

The second aspect of the present invention is a defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means; and matrix number analysis means for finding matrix numbers for the plurality of to-be-inspected objects based on a rotation angle found by the rotation angle calculation means.

The third aspect of the present invention is a defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means;

pitch size calculation means for finding vertical and horizontal pitch sizes of the plurality of to-be-inspected objects; and cell creation means for virtually finding lattice lines based on a rotation angle found by the rotation angle calculation means and a pitch size found by the pitch size calculation means and for virtually creating a cell of a size based on the pitch size at each intersection point of the lattice lines; and number analysis means for assigning matrix numbers to a plurality of cells created by the cell creation means and for numbering the plurality of to-be-inspected objects by using the cells assigned with corresponding matrix numbers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a schematic illustration taken by a camera 12 just above a test face 301 of a sample 11;

FIG. 4 is a view visualizing each bump 302's location coordinate found by blob analysis means 201;

FIG. 5 is a view explaining an effect of rotation angle calculation means 202;

FIG. 13A is a view schematically showing a test face on which bumps 1202 along even-numbered lines are slightly displaced horizontally from bumps 1203 along odd-numbered lines;

FIG. 13B is a graph showing location coordinates for bumps 1202 and 1203 in FIG. 13A, projected and accumulated on a projection axis;

FIG. 14 is a block diagram showing a configuration of a processing unit for the defect examination apparatus to which a second embodiment of the present invention is applied;

DETAILED DESCRIPTION OF THE INVENTION

Figure 1:
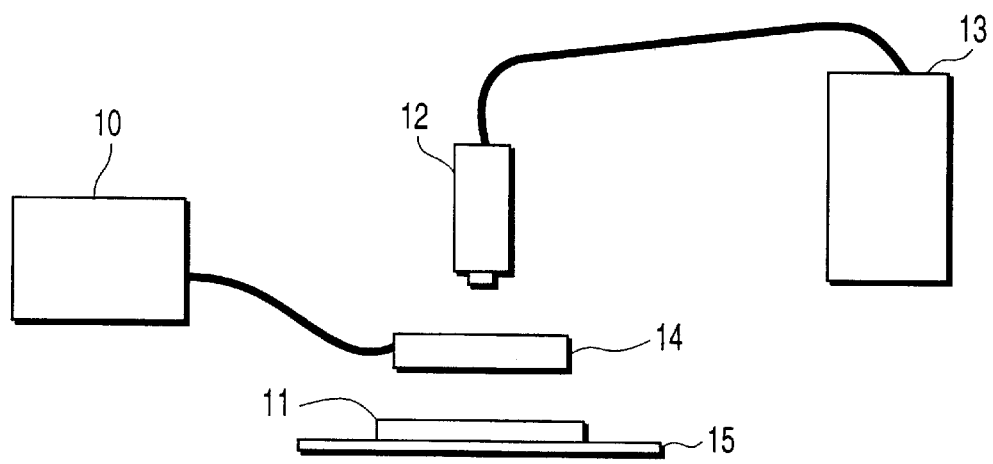
FIG. 1 is a view schematically showing a configuration of a defect examination apparatus to which an embodiment of the present invention is applied.

Embodiments of the present invention will be described in further detail with reference to the accompanying drawings. FIG. 1 is a view schematically showing a configuration of a defect examination apparatus to which an embodiment of the present invention is applied. A sample 11 as a to-be-inspected object is placed on a sample mount 15. A light source 10 generates light for inspection. The light source 10 is connected with lighting equipment 14 for illuminating the sample 11. A camera 12 is used for photographing the sample 11 for processing in a processing unit 13 as will be described later.

First Embodiment

Figure 2:
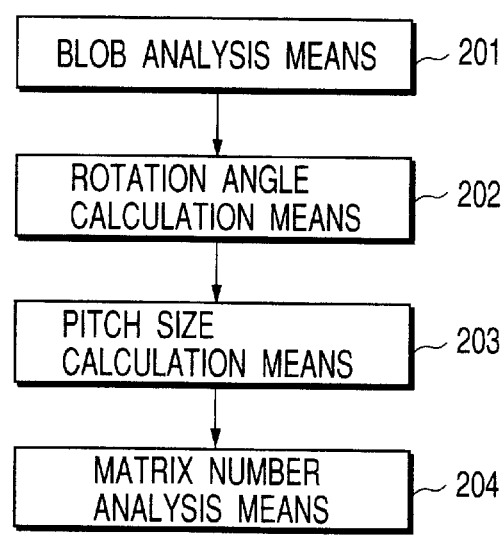
FIG. 2 is a block diagram showing a configuration of a processing unit for the defect examination apparatus to which a first embodiment of the present invention is applied.

FIG. 2 is a block diagram showing a configuration of a processing unit for the defect examination apparatus to which the first embodiment of the present invention is applied. The processing unit comprises a blob analysis means 201, a rotation angle calculation means 202, a pitch size calculation means 203, and a matrix number analysis means 204. FIG. 3 is a schematic illustration taken by the camera 12 just above a test face 301 of the sample 11. On the test face 301, there are regularly provided bumps 302 under inspection in a matrix.

When the camera 12 photographs the test face 301 provided with bumps 302 as shown in FIG. 3, the photographed image is transferred to the blob analysis means 201 in the processing unit 13. The blob analysis means 201 finds a coordinate for each bump 302's centroid location or a coordinate for a center location of a rectangle externally contacting each bump 302. In the following description, both coordinates are generically referred to as a location coordinate.

FIG. 4 is a view visualizing each bump 302's location coordinate found by the blob analysis means 201. The location coordinate is marked with "X". A distance between location coordinates is referred to as a pitch size or a lattice constant indicated with PX or PY in FIG. 4. Bumps enclosed in a broken line are called bumps 20 on the first row. Bumps enclosed in an alternate long and short dash line are called bumps 21 on the first column. Similarly, bumps are defined on the second, third lines, and so on, and on the second, third columns, and so on.

The location coordinate found in the blob analysis means 201 is transferred to the rotation angle calculation means 202. The rotation angle calculation means 202 finds a rotation angle against the image of a series of bumps 302, namely a bump 302 series angle. This angle corresponds to an angle $\theta_c$ between a line approximately formed along location coordinates for bumps 302 on a given row (column) and a horizontal (vertical) line.

The found bump series angle $\theta_c$ and the location coordinate for each bump 302 are transferred to the pitch size calculation means 203 for finding horizontal and vertical pitch sizes.

The processing unit transfers each bump 302's location coordinate found in the blob analysis means 201, the bump 302 series angle and the angle $\theta_c$ found in the rotation angle calculation means 202, and the vertical and horizontal pitch sizes found in the pitch size calculation means 203 to the matrix number analysis means 204. The matrix number analysis means 204 analyzes a row number and a column number for each bump 302.

The following describes in detail operations of the rotation angle calculation means 202, the pitch size calculation means 203, and the matrix number analysis means 204 by using an example of finding a row number for each bump 302.

The following describes how the rotation angle calculation means 202 is used for finding a rotation angle. As shown in FIG. 5, a projection axis 501 forms an angle θ against the Y axis. Projecting and accumulating location coordinates for the bumps on each row forms a frequency distribution 22 on the projection axis. The frequency distribution 22 corresponding to each row or column is hereafter referred to as a crest. The following equation is used for finding an evaluation value.

$E_\theta$ assuming that a half-value width of each crest is $W_i$ (i=1, 2, ...), a height (peak value) thereof is $H_i$ (i=1, 2, ...), and the number of crests is N.

$$E_\theta = \frac{1}{N} \sum_i \frac{H_i}{W_i} \quad (1)$$

As seen from this equation, the embodiment uses the evaluation value $E_\theta$ for finding an average value for ratios between respective frequency distribution heights and half-value widths.

As the projection axis 501 approaches a right angle against a horizontal series of bumps 302, it is obvious that the crest's half-value width W narrows and the height H increases. When the projection axis 501 becomes perpendicular to a series of bumps, the evaluation value $E_\theta$ becomes maximum.

At this time, an angle θ formed between the Y axis and the projection axis 501 becomes a bump series angle $\theta_c$ to be found. Accordingly, the evaluation value $E_\theta$ can be found by varying a projection axis angle at a prescribed angle pitch within a prescribed angle range including $\theta_c$, thus finding the bump series angle $\theta_c$.

Figure 6:
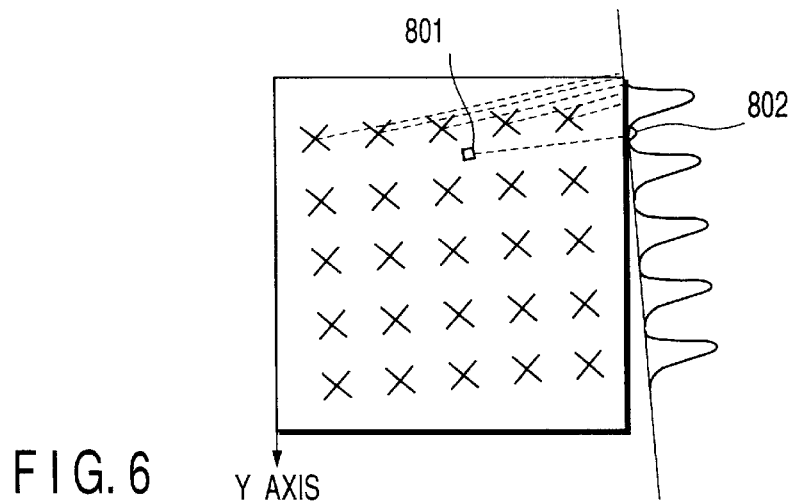
FIG. 6 is a view explaining an effect when dust 801 is detected as a bump 302 to determine a location coordinate.

FIG. 6 is a view showing that dust 801 is extracted like the bump 302 for finding the location coordinate. Even in this case, a crest 802 resulting from the dust 801 is much smaller than the other crests and is therefore negligible. Even if the crest 802 is not negligible, it hardly affects the evaluation value to be found because this value results from an average of respective crests.

Figure 7:
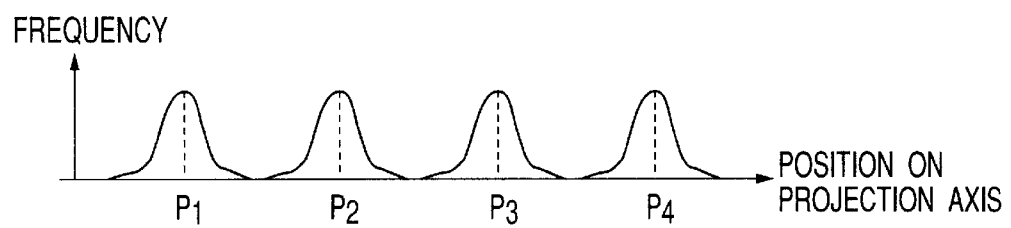
FIG. 7 is a view explaining an effect of pitch size calculation means 203.

The following describes how the pitch size calculation means 203 is used for finding a pitch size. A graph as shown in FIG. 7 is created by newly projecting and accumulating location coordinates for the bumps on a projection axis which forms the angle $\theta_c$ found by the rotation angle calculation means 202 against the Y axis. The ordinate axis denotes frequency. The abscissa axis shows a location on the projection axis. This graph is used to find a peak location $P_i$ for each crest. It is obvious that a distance between peaks equals a vertical pitch size for bumps. Accordingly, the following equation can be used for finding a vertical pitch size PY for bumps.

$$PY = \frac{1}{N-1} \sum_{i}^{N-1} |P_{i+1} - P_i| \qquad (2)$$

As seen from this equation, the embodiment uses the vertical pitch size PY for bumps to find an average value for distances between adjacent peak locations.

Figure 8:
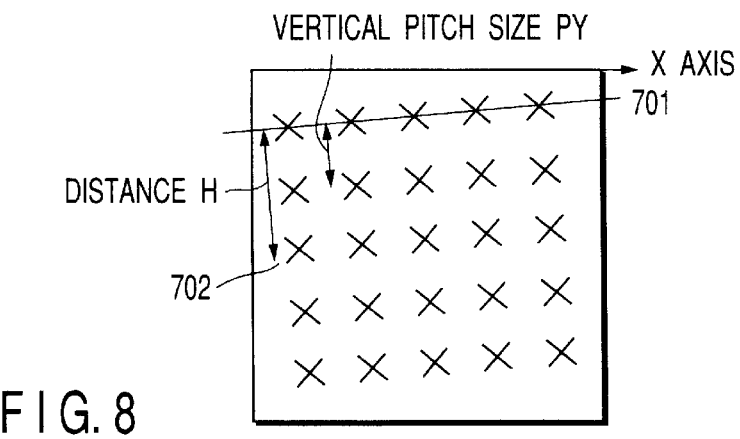
FIG. 8 is a view explaining an effect of matrix number analysis means 204.

Finally, the following describes how the matrix number analysis means 204 is used for finding a matrix number. As shown in FIG. 8, the means finds a reference line 701 which crosses location coordinates for the topmost bumps in the image and forms the angle $\theta_c$ against the X axis. Then, the means finds a distance H from a location coordinate (702 in this figure) for a targeted bump to the reference line 701. The means divides the distance H by the vertical pitch size PY found by the pitch size calculation means 203. The found value is rounded off at the first decimal place to obtain an integer value. The obtained integer value is incremented by 1. The final result is used as a row number for the targeted bump. In FIG. 8, the bump 702 will have a row number 3. The above-mentioned operation is performed for each bump to find row numbers for all the bumps. The same method can be used to find column numbers for bumps.

This method enables to find a matrix number for each bump without previously registering a pitch size between bumps. Dust does not cause an incorrect number to be found.

Figure 9:
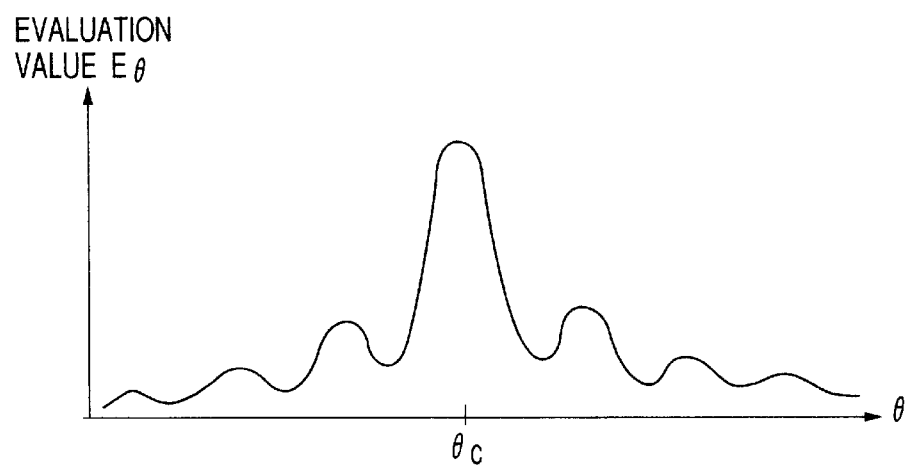
FIG. 9 is a view showing relationship between an evaluation value $E_\theta$ and $\theta$.
Figure 10:
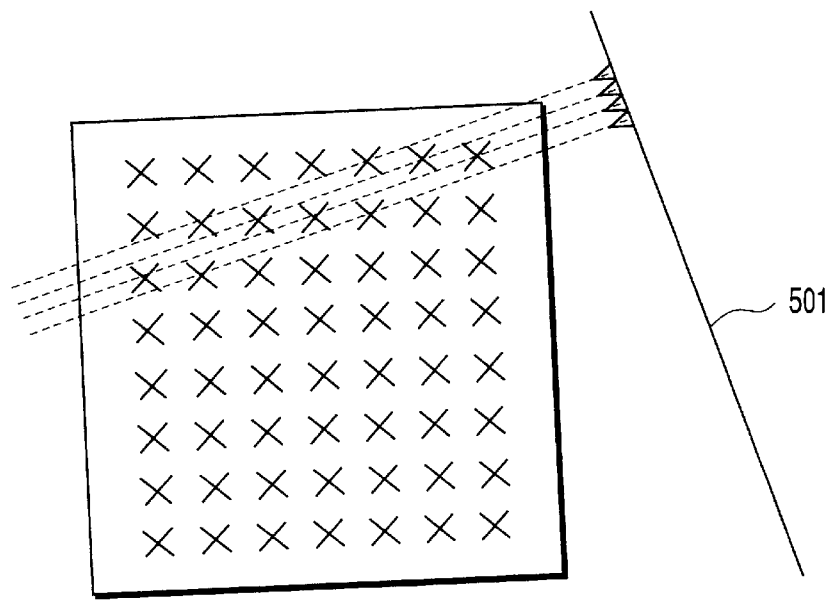
FIG. 10 is a view explaining why a local maximum is generated in FIG. 9.

The following describes another calculation method by the rotation angle calculation means 202. FIG. 9 is a view showing relationship between the evaluation value $E_\theta$ and $\theta$ according to the above-mentioned method. In FIG. 9, a local maximum occurs. This is because a straight line crosses bumps on a plurality of rows even if the projection axis 501 is not perpendicular to a series of bumps as shown in FIG. 10. The following equation is used to find the evaluation value $E_\theta$ so that a difference between the maximum value in FIG. 9 and the local maximum becomes greater, considering an area $S_i$ for each crest. The relationship between the evaluation value $E_\theta$ and $\theta$ becomes as shown in FIG. 11 and is assumed to approximately form a smooth curve.

$$E_\theta = \frac{1}{N} \sum_i \frac{S_i \times H_i}{W_i} \qquad (3)$$

Figure 11:
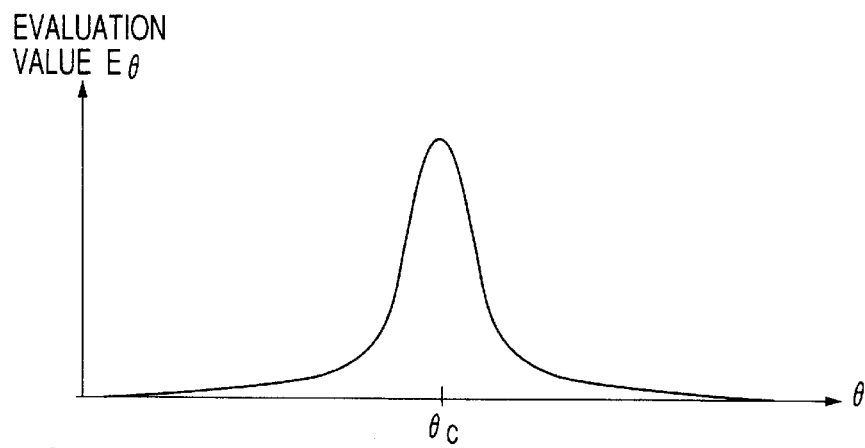
FIG. 11 is a view showing relationship between an evaluation value $E_\theta$ and $\theta$ when a local maximum problem is solved.

No local maximum occurs for the relationship between the evaluation value $E_\theta$ and $\theta$ as shown in FIG. 11, preventing a trap by the local maximum. Consequently, fast processing is available according to the following processing method.

Figure 12:
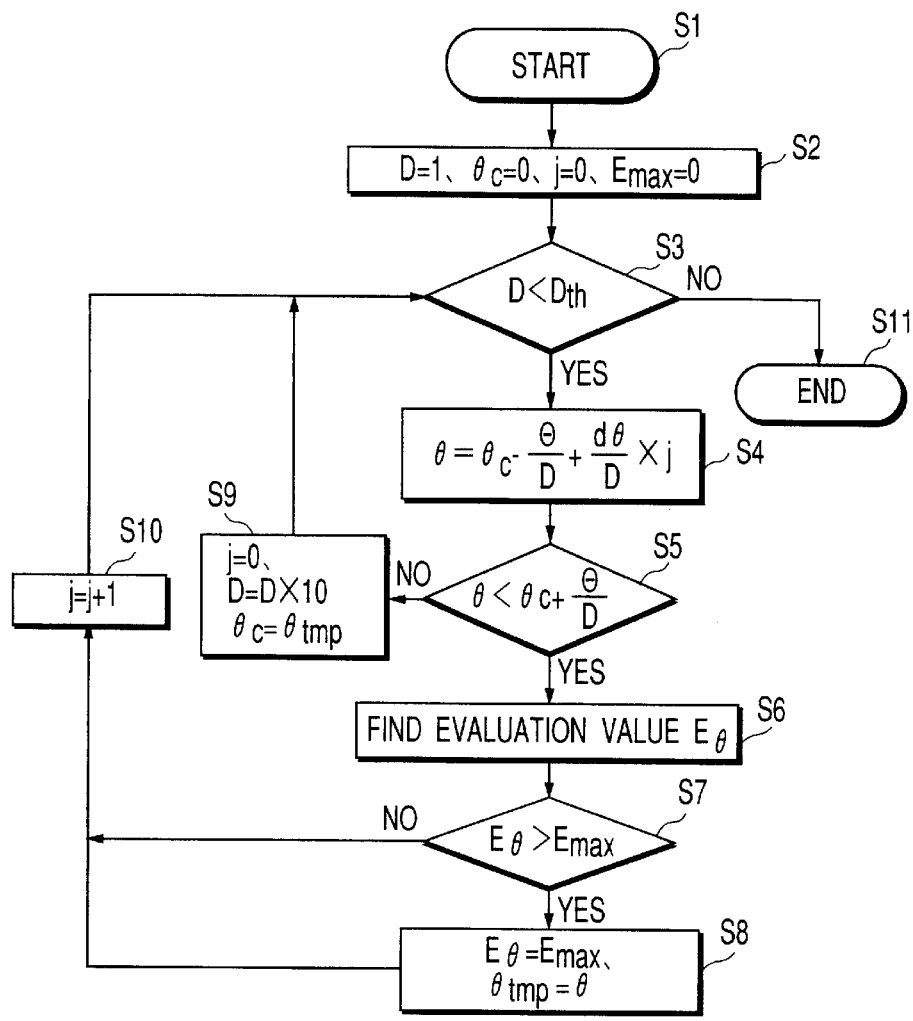
FIG. 12 is a flowchart explaining a detail of high-speed processing.

FIG. 12 is a flowchart explaining a detail of high-speed processing. A flow of high-speed processing starts at step S1. At step S2, variables D, $\theta_c$, j, and $E_{max}$ are initialized. Control advances to step S3 to check if the variable D is smaller than a prescribed value $D_{th}$. Control advances to step S4 when the result is true, otherwise to step S11 to terminate the processing.

At step S4, the following equation is used to calculate a rotation angle $\theta$.

$$\theta = \theta c - \frac{\Theta}{D} + \frac{d\theta}{D} \times j \qquad (4)$$

In this equation, $\Theta$ is a one-sided deviation angle range of the projection axis; $d\theta$ is a pitch angle thereof. To find the evaluation value within the range from –5° to 5° at a 1° pitch angle, for example, the equation assumes $\Theta$=5 and $d\theta$=1.

Control then advances step S5 to check if the angle $\theta$ satisfies the following equation.

$$\theta < \theta_c + \frac{\Theta}{D} \qquad (5)$$

Control advances to step S6 when the result is true, otherwise to step S9. At step S6, the evaluation value $E_\theta$ is found for the angle $\theta$ found at step S5. Control advances to step S7 to check if $E_\theta$ is greater than $E_{max}$. Control advances to step S8 when the result is true, otherwise to step S10. At step S8, the processing updates the $E_{max}$ value and saves the angle $\theta$ for the projection axis at that time in $\theta_{tmp}$, then proceeds to step S10.

At step S10, j is incremented. Then, control returns to step S3.

When the result is false at step S5, control advances to step S9. At step S9, the processing initializes j, multiplies D by a specified value, say 10, substitutes the saved $\theta_{tmp}$ for $\theta_c$, then returns to step S3.

As mentioned above, another method of the rotation angle calculation means 202 evaluates a wide evaluation range at a rough pitch angle to find $\theta$ for the maximum evaluation value. The method evaluates the range around the found $\theta$ at a finer pitch angle and repeats this process. Consequently, it is possible to find the angle $\theta$ for the maximum evaluation value remarkably faster than a method of thoroughly evaluating a wide evaluation range at a fine pitch angle from the beginning.

The following describes another calculation method of the pitch size calculation means 203.

FIG. 13A is a view schematically showing a test face on which bumps 1202 along even-numbered lines are slightly displaced horizontally from bumps 1203 along odd-numbered lines (i.e., the bumps are arranged in a staggered pattern). FIG. 13B is a graph showing location coordinates for bumps 1202 and 1203 in FIG. 13A, projected and accumulated on a projection axis. There may arise a problem when bumps 1202 and 1203 are arranged irregularly in a staggered pattern. Namely, if the pitch size corresponds to an average value for distances among the crest peak locations in FIG. 13B, it may be impossible to distinguish, say, a bump on the first column from a bump on the second column.

Another calculation method of the pitch size calculation means 203 assumes the minimum distance among peak locations for the crests in FIG. 13B to be a pitch size. This method enables to correctly find a matrix number if bumps 1202 and 1203 are arranged in a staggered pattern as shown in FIG. 13A.

Second Embodiment

The following describes the second embodiment of the present invention. The first embodiment finds a matrix number based on the bump series angle and the pitch size. However, it is possible to find a matrix number without calculating the pitch size.

FIG. 14 is a block diagram showing a configuration of a processing unit 13 according to the second embodiment of the present invention. The processing unit comprises a blob analysis means 1301, a rotation angle calculation means 1302, and a matrix number analysis means 1303.

First, the blob analysis means 1301 finds each location coordinate of a bump. The rotation angle calculation means 1302 finds a rotation angle for a series of bumps according to the similar method as described in the first embodiment. The matrix number analysis means 1303 rotates the projection axis according to a rotation angle found by the rotation angle calculation means 1302. Location coordinates of the respective bumps are projected and accumulated onto the projection axis to provide a graph similar to that shown in FIG. 7. In this graph, sequence numbers are assigned to these crests in order. When each crest is associated with the corresponding bump, the crest number is used as a row number or a column number for that bump, thus providing a matrix number.

The second embodiment omits the process for calculating a pitch size, making it possible to fast find a matrix number of each bump. This embodiment eliminates the need for considering an average value or a minimum value among crest peak locations even if bumps are arranged irregularly as in a staggered pattern.

Third Embodiment

Figure 15A:
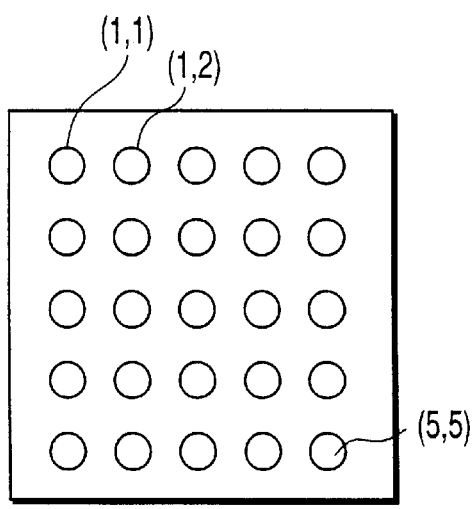
FIGS. 15A and 15B are views explaining a third embodiment of the present invention.
Figure 15B:
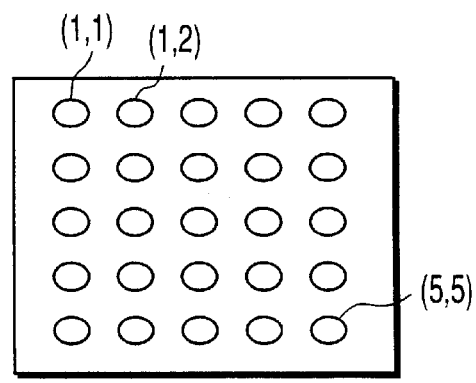
Figure 16:
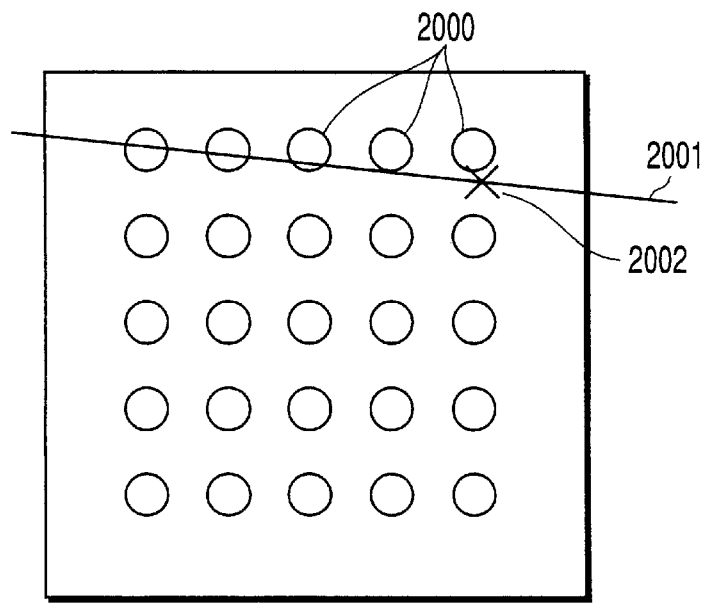
FIG. 16 is a view explaining a problem in the prior art.

The following describes the third embodiment of the present invention. FIGS. 15A and 15B schematically represent images of the same to-be-inspected object photographed by two image measuring means with different pixel resolutions. In FIGS. 15A and 15B, the same bump is assigned the same matrix number. Two image measuring means each should measure different items such as a bump diameter and a bump height, for example. The same bumps need to be associated to each other for comprehensive judgment by integrating measurement results of each bump measured by two image measuring means. It is possible to easily associate the same bumps to each other when a matrix number is found for each bump by using two image measuring means according to the methods as described in the first and second embodiments. This can easily integrate measurement results from the respective image measuring means.

The third embodiment enables to integrate and comprehensively judge each bump's results measured by a plurality of image measuring means. Thereby, the embodiment eliminates the need for calibrating or correcting each image measuring means, and matching respective measurement results.

Fourth Embodiment

Figure 17:
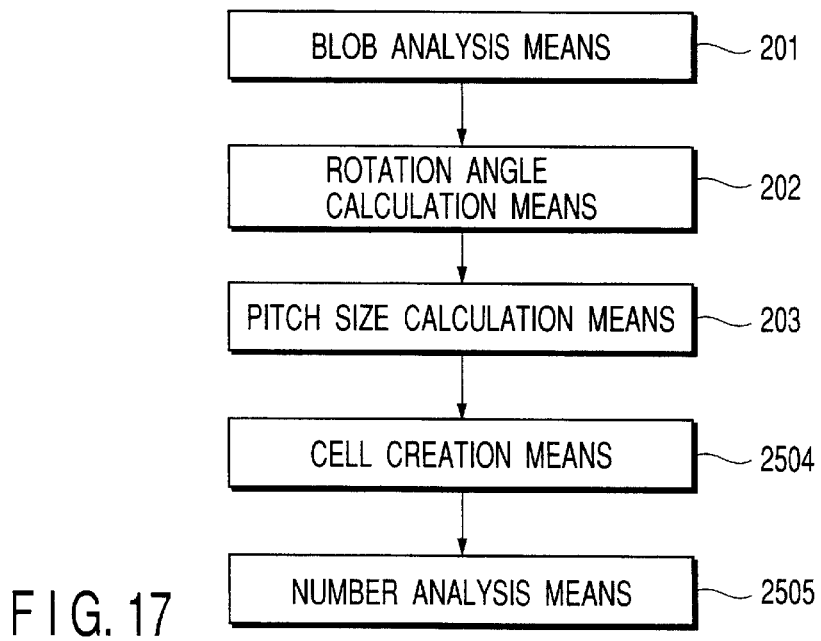
FIG. 17 is a block diagram showing a configuration of a processing unit for the defect examination apparatus to which a fourth embodiment of the present invention is applied.

FIG. 17 is a block diagram showing a configuration of a processing unit for the defect examination apparatus to which the fourth embodiment of the present invention is applied. The processing unit comprises blob analysis means 201, rotation angle calculation means 202, pitch size calculation means 203, cell creation means 2504, and number analysis means 2505. Here, a cell means a square region virtually provided on the image.

The blob analysis means 201, the rotation angle calculation means 202, and the pitch size calculation means 203 in FIG. 17 are same as those described in the first embodiment. The description thereof is omitted here.

Figure 18:
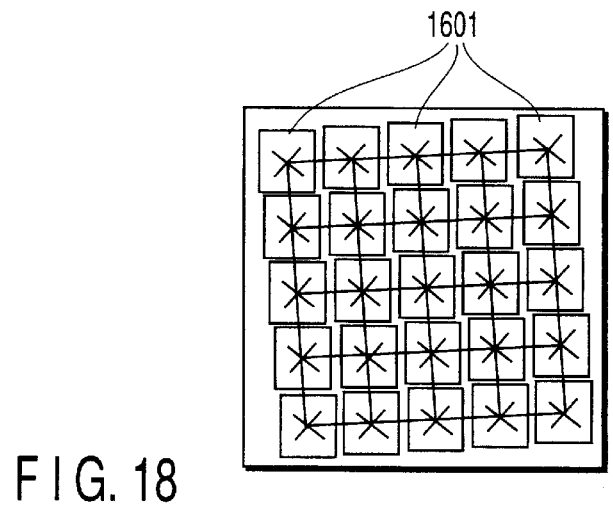
FIG. 18 is a view explaining how cell creation means 2504 creates cells.

The blob analysis means 201 finds a location coordinate for each bump 302. The rotation angle calculation means 202 finds an angle $\theta_c$ for a series of bumps (equivalent to bumps 302 in the first embodiment). The pitch size calculation means 203 finds vertical and horizontal pitch sizes. The thus calculated location coordinate, the angle $\theta_c$, and the vertical and horizontal pitch sizes are transferred to the cell creation means 2504. FIG. 18 shows how a cell is created for each bump 302 around a corresponding intersection point resulting from crossing lattice lines. The number analysis means 2505 then assigns a matrix number to each cell 1601 created by the cell creation means 2504. Each bump is given the same matrix number as the cell 1601 which contains that bump.

To be more specific, the cell creation means 2504 virtually creates lattice lines crossing each bump. The means creates a cell 1601 around an intersection point of lattice lines for each intersection point. The virtual lattice line can be created easily because there are already determined bump series angle $\theta_c$ and vertical and horizontal pitch sizes. Vertical and horizontal sizes of the cell 1601 approximately equal vertical and horizontal pitch sizes, respectively.

The number analysis means 2505 assigns a matrix number to the cell 1601 created by the cell creation means 2504. A row number 1 is assigned to the cell 1601 on the topmost virtual lattice line in the image. A row number 2 is assigned to the cell 1601 just below the row number 1. Similarly, row numbers are sequentially assigned to the cells 1601 on the third and fourth lines. Similarly, column numbers are assigned from the leftmost column.

When all the cells 1601 are given matrix numbers, a bump in each cell 1601 is found. A matrix number for the bump is found by assigning the same matrix number as the cell to that bump.

The above-mentioned method enables to find a matrix number for each bump without previously specifying pitch sizes among bumps, the number of rows and columns. If a bump is displaced from the specified location, the use of a cell with a given size prevents an incorrect matrix number from being assigned.

Figure 19:
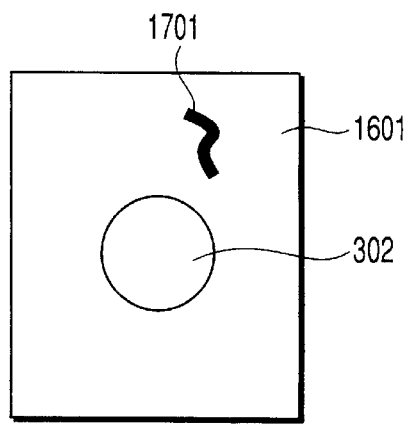
FIG. 19 is a view showing a situation where a cell 1601 contains a bump 302 and dust 1701.
Figure 20:
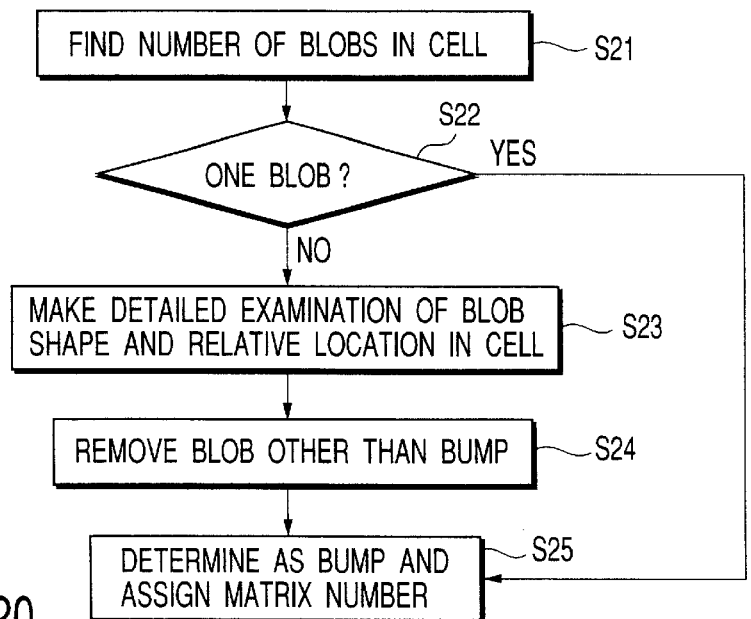
FIG. 20 is a flowchart explaining how to process dust.

The following describes how to process dust. FIG. 19 shows one cell 1601. AS shown in FIG. 19, the cell 1601 contains the bump 302 and dust 1701. When the dust 1701 is found like in this case, a process is performed according to the flowchart in FIG. 20. The number of blobs in the cell is counted (step S21). When the number of blobs is 1, control goes to YES at step S22 for assigning a matrix number as normal processing (step S25). When the number of blobs exceeds 1, control goes to NO at step S22 for examining in detail each blob shape and relative location in the cell (step S23). There is a method for examining a blob shape according to a ratio between the maximum diameter and the minimum diameter for the blob. This ratio value helps determine whether the shape is a circle or an oval. Another method uses a ratio between a circumference and an area. This ratio is 1 for a complete round. A normal bump should be centered on the cell. It is possible to find the bump more accurately by finding each blob location in the cell. At step S24, anything other than a bump is removed. At step S25, the finally remaining blob is assumed to be a true bump and is assigned a matrix number.

The method described here enables to correctly assign a matrix number only to a bump even if the cell contains dust. In addition, there is no need to find each blob shape or location in detail from the beginning, providing fast processing. Anything other than a bump is removed at step S24 in FIG. 20. It may be preferable to output a report notifying that the bump is abnormal.

Fifth Embodiment

The fourth embodiment assumes that all to-be-inspected objects are arranged regularly. The fifth embodiment is applicable to a case where there are provided irregularly arranged to-be-inspected objects.

Figure 21:
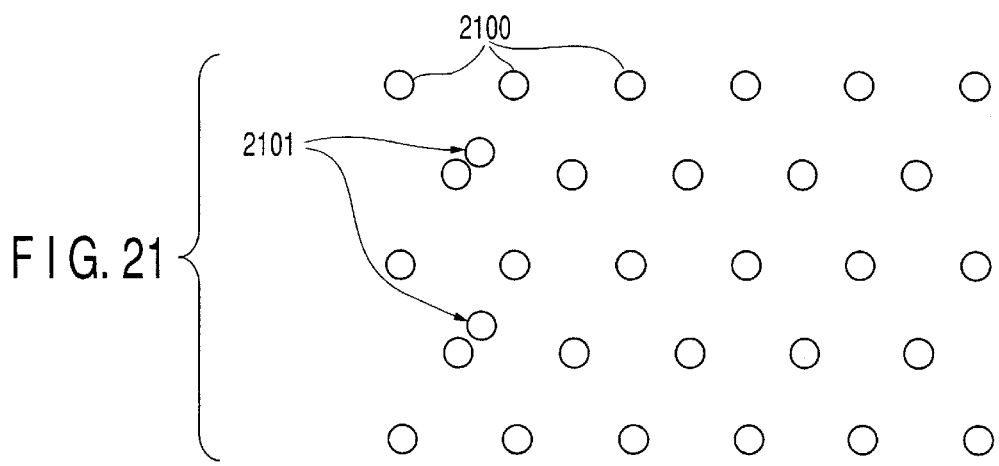
FIG. 21 is a view showing that several bumps are arranged irregularly in bumps arranged in a staggered pattern.

FIG. 21 shows that several bumps 2101 are arranged irregularly in bumps 2100 arranged in a staggered pattern.

Figure 22:
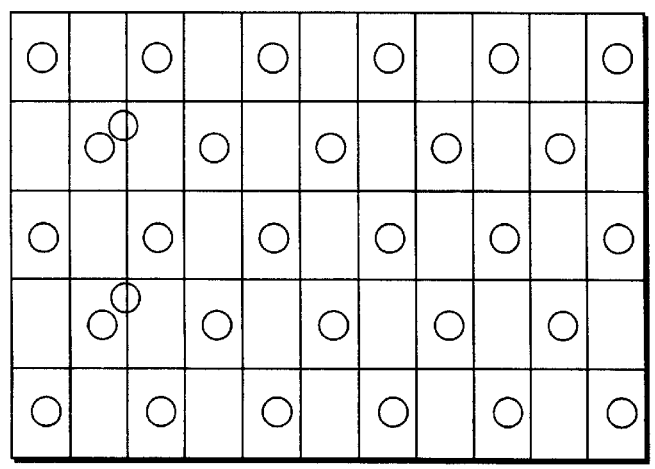
FIG. 22 is a view showing that the fourth embodiment is used to create cells for the bump arrangement as shown in FIG. 21.

FIG. 22 shows that the fourth embodiment is used to create cells for such an arrangement of bumps as shown in FIG. 21. Irregular bumps 2101 are much fewer than normal bumps 2100 and hardly affect a process of finding pitch sizes. In FIG. 22, the cells with matrix numbers (2, 2) and (4, 2) each contain one irregular bump 2101. In this case, the following method can assign unique numbers to all bumps without increasing matrices.

Namely, in addition to matrix numbers, sequence numbers are assigned to bumps in order from the one nearest to the cell center. For example, a number 2-2-1 is assigned to the normal bump 2100; a number 2-2-2 is assigned to the irregular bump 2101. With respect to the number 2-2-1, first two values correspond to the matrix number. The last value indicates a number in the cell. In this case, the cell with the matrix number (2, 2) contains not only the normal bump 2100 at the approximate center, but also the irregular bump 2100.

When the cell contains only one bump, a number in the cell is assigned.

When the cell with a matrix number (4, 2) contains the irregular bump 2101, the same rule is used to assign numbers such as 4-2-1 and 4-2-2.

Even if a work contains irregular bumps, the above-mentioned method enables to provide unique numbering without increasing matrices.

Sixth Embodiment

Figure 23:
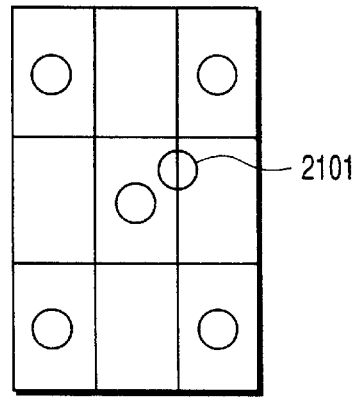
FIG. 23 is a view showing that an irregular bump exists on a boundary.
Figure 24A:
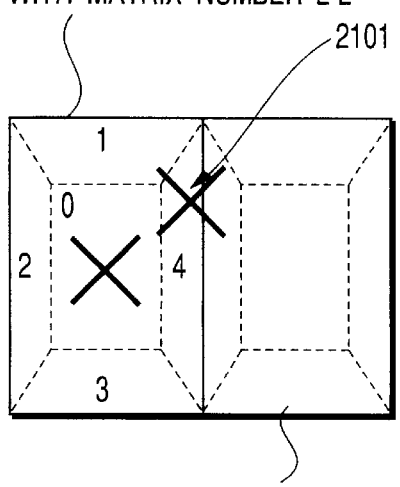
FIG. 24A is a view showing that an irregular bump 2101 is located in a left cell.

When a bump exists on the cell boundary, such a bump is not necessarily identified within the same cell depending on work or sensor differences. When a work is photographed for finding centroid locations of respective bumps, for example, the irregular bump 2101 may exist on a cell boundary as shown in FIG. 23. When one sensor is used for photographing the work, the irregular bump 2101 belongs to the left cell as shown in FIG. 24A. When another sensor is used for photographing the work, the bump 2101 belongs to the right cell as shown in FIG. 24A.

Figure 24B:
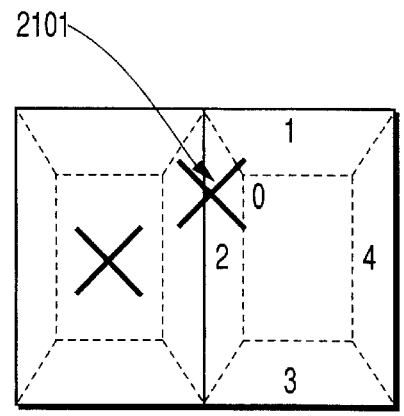
FIG. 24B is a view showing that an irregular bump 2101 is located in a right cell.

As indicated with a broken line in FIG. 24A, there is formed at the cell center a rectangular region which is vertically and horizontally as half as the cell. Two diagonal lines are drawn for the cell to divide it into five regions. Each region is assigned a number. As shown in the figure, for example, the center region is assigned a number 0. Surrounding regions are numbered from 1 to 4 counterclockwise. For numbering each bump, first the cell's matrix number is assigned, then a region number is assigned, finally a number in the region is assigned sequentially from the nearest to the cell center. In FIG. 24A, the irregular bump 2101 is numbered 2-2-4-1. In FIG. 24B, it is numbered 2-3-2-1.

Figure 25:
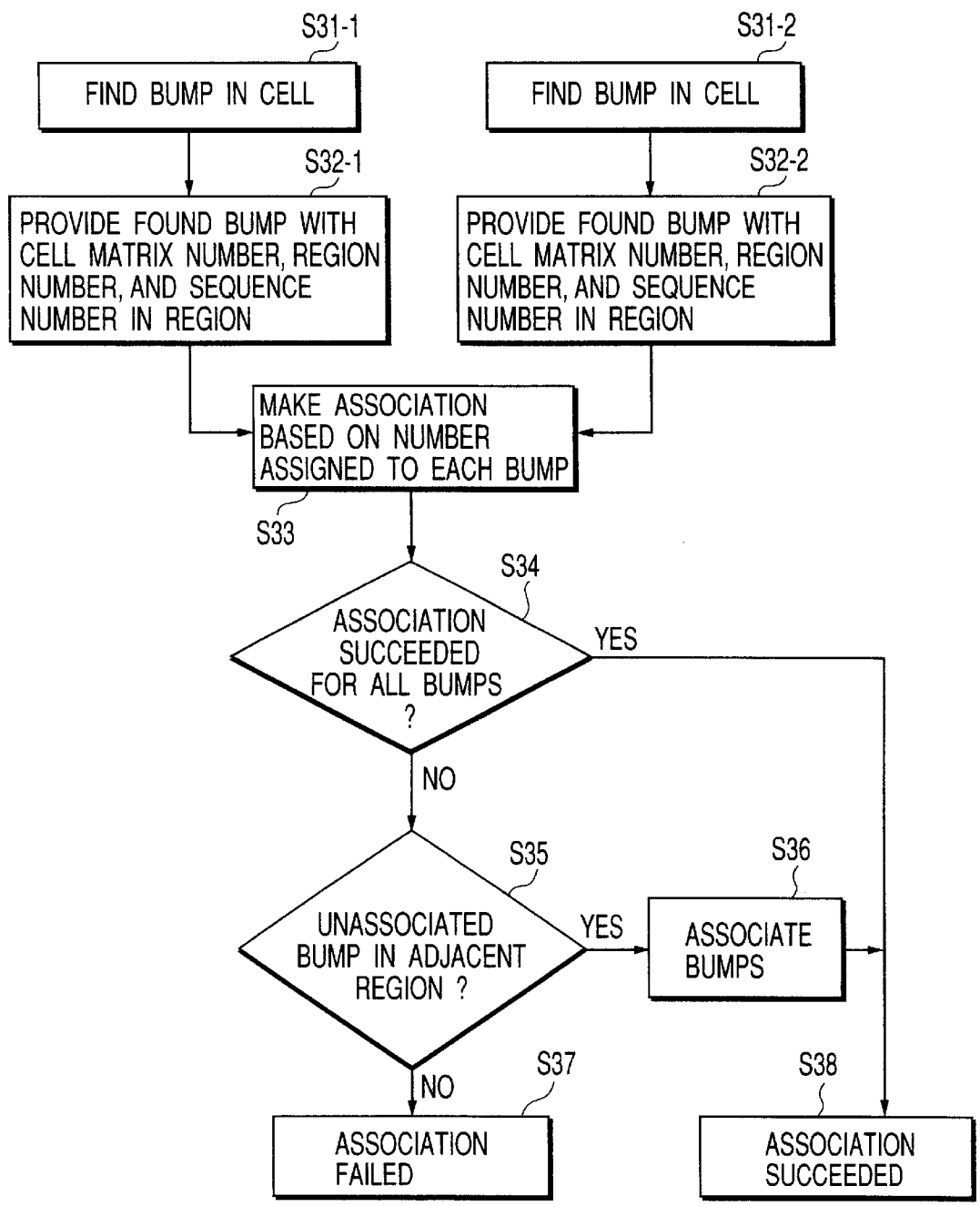
FIG. 25 is a view showing an algorithm for associating same bumps with each other.

FIG. 25 shows an algorithm for associating same bumps with each other. This algorithm explains association between two sensors. The same processing is applicable when the same sensor is used for different works. At steps S31-1 and S31-2, each sensor finds a bump in a cell. At steps S32-1 and S32-2, the found bump is assigned the cell's matrix number, a region number, and a sequence number in the region.

At step S33, an association is made between the respective bumps based on the assigned numbers. Here, an association is made between the bumps whose numbers match completely. At step S34, a determination is made whether all bumps are associated to each other. If so, control advances to step S38 to terminate the association.

If an unassociated bump is found at step S34, control advances to step S35. It is examined whether there are bumps not associated with the adjacent region. If such bumps are found, control advances to step S36 to associate both. If no such bumps are found, control advances to step S37 to terminate the association unsuccessfully.

The above-mentioned method enables correct association between different works or sensors even if there are irregularly arranged bumps.

The present invention can provide a defect examination apparatus which can accurately and fast assign a unique number to each bump and eliminate complicated operations for specifying a search range and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means, the rotation angle calculation means finding an optimal rotation angle by using a frequency distribution found by projecting and accumulating to-be-inspected objects' location coordinates onto a prescribed projection axis;

pitch size calculation means for finding vertical and horizontal pitch sizes of the plurality of to-be-inspected objects from distances between adjacent peak locations of frequency distributions corresponding to respective rows and columns; and matrix number analysis means for finding a matrix number for each to-be-inspected object based on a rotation angle found by the rotation angle calculation means and a pitch size found by the pitch size calculation means.

2. The defect examination apparatus according to claim 1, wherein the rotation angle calculation means, with respect to a frequency distribution obtained by projecting and accumulating respective to-be-inspected objects' location coordinates onto projection axes rotated at prescribed angles against X and Y axes, finds an evaluation value for an angle of the projection axis based on a ratio between a peak value and a half-value width for any of frequency distributions corresponding to respective rows and columns, and determines a projection axis angle for the maximum evaluation value to be a rotation angle for a series of to-be-inspected objects.

3. The defect examination apparatus according to claim 2, wherein the pitch size calculation means assumes an average distance between the adjacent peak locations to be a pitch size.

4. The defect examination apparatus according to claim 2, wherein the pitch size calculation means assumes a minimum distance between the adjacent peak locations to be a pitch size.

5. The defect examination apparatus according to claim 1, wherein the rotation angle calculation means, with respect to a frequency distribution obtained by projecting and accumulating respective to-be-inspected objects' location coordinates onto projection axes rotated at prescribed angles against X and Y axes, finds an evaluation value for an angle of the projection axis based on a peak value, a half-value width, and an area for any of frequency distributions corresponding to respective rows and columns, and determines a projection axis angle for the maximum evaluation value to be a rotation angle for a series of to-be-inspected objects.

6. A defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means, the rotation angle calculation means finding an optimal rotation angle by using a frequency distribution found by projecting and accumulating to-be-inspected objects' location coordinates onto a prescribed projection axis; and matrix number analysis means for finding matrix numbers for the plurality of to-be-inspected objects based on a rotation angle found by the rotation angle calculation means and peak locations of frequency distributions corresponding to respective rows and columns of the plurality of to-be-inspected objects.

7. A defect examination apparatus for detecting defect locations of a plurality of to-be-inspected objects vertically and horizontally arranged according to a prescribed rule, comprising:

blob analysis means for finding location coordinates of the plurality of to-be-inspected objects;

rotation angle calculation means for finding a rotation angle for a horizontal series of the plurality of to-be-inspected objects against a horizontal line and a rotation angle for a vertical series of the plurality of to-be-inspected objects against a vertical line based on a location coordinate found by the blob analysis means, the rotation angle calculation means finding an optimal rotation angle by using a frequency distribution found by projecting and accumulating to-be-inspected objects' location coordinates onto a prescribed projection axis;

pitch size calculation means for finding vertical and horizontal pitch sizes of the plurality of to-be-inspected objects from distances between adjacent peak locations of frequency distributions corresponding to respective rows and columns; and cell creation means for virtually finding lattice lines based on a rotation angle found by the rotation angle calculation means and a pitch size found by the pitch size calculation means and for virtually creating a cell of a size based on the pitch size at each intersection point of the lattice lines; and number analysis means for assigning matrix numbers to a plurality of cells created by the cell creation means and for numbering the plurality of to-be inspected objects by using the cells assigned with corresponding matrix numbers.

8. The defect examination apparatus according to claim 7, characterized by determining whether there are two or more blobs in the cell, and, when there are two or more blobs, determining whether to inspect each of blobs.

9. The defect examination apparatus according to claim 7, when the cell contains the plurality of to-be-inspected objects, characterized by sequentially providing numbers in order from a to-be-inspected object nearest to the cell center.

10. The defect examination apparatus according to claim 7, characterized by dividing the cell into a plurality of regions, numbering these regions, and providing the plurality of to-be-inspected objects with numbers assigned to the regions for managing the plurality of to-be-inspected objects.

* * * * *